United States Patent [19]
Williams et al.

[11] Patent Number: 5,694,583
[45] Date of Patent: Dec. 2, 1997

[54] BIOS EMULATION PARAMETER PRESERVATION ACROSS COMPUTER BOOTSTRAPPING

[75] Inventors: Donald D. Williams, Boca Raton; Stanley L. Merkin, Lakeworth; Charles R. Dart, II, Boca Raton, all of Fla.

[73] Assignee: International Business Machines Corporation, Armonk, N.Y.

[21] Appl. No.: 811,329

[22] Filed: Mar. 4, 1997

Related U.S. Application Data

[63] Continuation of Ser. No. 312,749, Sep. 27, 1994, abandoned.
[51] Int. Cl.$^6$ .............. G06F 9/24; G06F 9/445; H04L 9/00
[52] U.S. Cl. .............. 395/500; 395/652; 380/4; 364/280.2
[58] Field of Search .............. 395/652, 500; 380/3, 4; 364/280.2

[56] References Cited

U.S. PATENT DOCUMENTS

| | | | |
|---|---|---|---|
| 5,128,995 | 7/1992 | Arnold et al. | 380/4 |
| 5,193,174 | 3/1993 | Bealkowski et al. | 395/500 |
| 5,210,875 | 5/1993 | Bealkowski et al. | 395/700 |
| 5,230,052 | 7/1993 | Dayan et al. | 395/700 |
| 5,388,156 | 2/1995 | Blackledge et al. | 380/4 |
| 5,388,267 | 2/1995 | Chan et al. | 395/700 |
| 5,418,918 | 5/1995 | Vander Kamp et al. | 395/700 |
| 5,432,939 | 7/1995 | Blackledge et al. | 395/700 |
| 5,465,357 | 11/1995 | Bealkowski et al. | 395/700 |

*Primary Examiner*—Kevin J. Teska
*Assistant Examiner*—Tyrone V. Walker
*Attorney, Agent, or Firm*—Bernard D. Bogdon

[57] ABSTRACT

In a computer operating a bootable CD-ROM or other bootable media having the capability of emulating one or more real drives, BIOS emulation parameters, such as drive number, memory partitioning and mapping are moved from BIOS and stored in a protected region of main memory. Upon a change of media, e.g., hard file, diskette, etc., as the computer undergoes a warm boot with new BIOS emulation parameters to enable DOS to process the change, the protected region of memory is not cleared. This preserves the BIOS emulation parameters which are restored to BIOS for the remainder of the boot sequence.

10 Claims, 13 Drawing Sheets

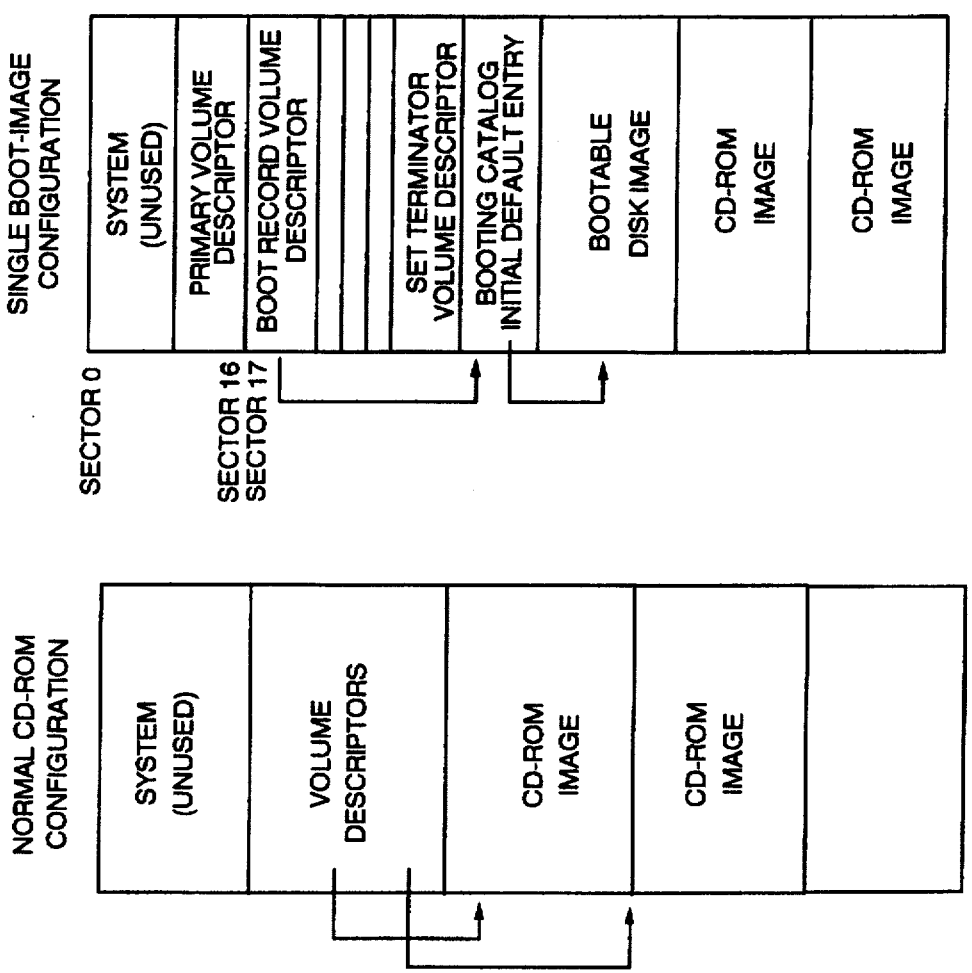
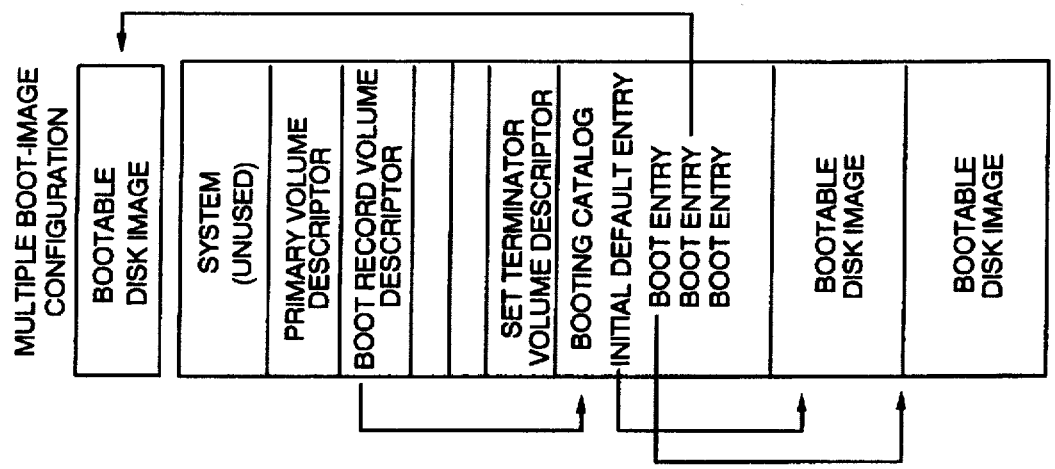

BIOS EMULATION PARAMETER PRESERVATION ACROSS COMPUTER BOOTSTRAPPING

The application is a continuation, of application Ser. No. 08/312,749, filed Sep. 27, 1994, now abandoned.

CROSS-REFERENCES TO RELATED APPLICATIONS

The subject matter presented herein relates to inventions described in the following applications, all filed on even date and under common ownership herewith: Williams, BIOS EMULATION OF A HARD FILE IMAGE AS A DISKETTE, U.S. Ser. No. 08/313,709, now abandoned; Williams et al., BIOS DYNAMIC EMULATION OF MULTIPLE DISKETTES FROM A SINGLE MEDIA, U.S. Ser. No. 08/313,710; and Williams, DATA PROCESSOR HAVING BIOS DECRYPTION OF EMULATED MEDIA IMAGES, U.S. Ser. No. 08/313,748, now abandoned.

BACKGROUND OF THE INVENTION

1. Field of the Invention

This invention relates generally to the bootstrapping sequence of a data processing system, such as a personal computer, and more particularly, to preserving prescribed media drive emulation parameters across a warm boot.

2. Description of Related Art

All computers, such as the various models of personal computers, or PC's, produced by IBM Corporation, execute "operating system software" that instructs the PC on how to use other programs, termed "application software," such as word processing and spreadsheet programs. Examples of PC operating systems include MS-DOS and WINDOWS, manufactured by Microsoft Corporation, and IBM's OS/2.

Before a PC can run an operating system, it must load the operating system from a disk to the PC's working memory which is ordinarily random access semiconductor memory (RAM). This is carried out through a process known as "bootstrapping," or more simply, "booting" the PC. Booting occurs automatically when the PC is first turned on a process called a "cold boot," or by the user while the computer is running ("warm boot").

Bootstrapping performs only two functions, the first being to run a power-on self-test, or POST, and the other to search the storage media (floppy diskette or hard disk) for the operating system it will load. These functions are controlled by firmware stored in one or more basic input-output system, or BIOS, chips inside the PC.

The POST initializes all the internal hardware and hardware connected to the PC known to it, such as memory, and tests and places the hardware in an operational state. The BIOS program then normally checks drive A of the PC to determine if it contains a formatted floppy disk. If a disk is mounted in the drive, the program searches specific locations on the disk to determine if a valid boot record exists. If the floppy drive is empty, the boot program checks the hard drive C for the system files. In the absence of these files, the BIOS will generate an error message.

After locating a disk with a valid boot record, the BIOS program reads the data stored on the first sector of the disk, and copies that data to specific locations in RAM. This information, found in the same location on every formatted disk, constitutes the DOS boot record. The BIOS then passes control to the boot record which instructs the PC on how to load the two hidden operating system files to RAM (the files named IBMBIO.COM and IBMDOS.COM on IBM computers). After loading other operating system files into RAM to carry out the rest of the boot up sequence, the boot record is no longer needed.

The root directory of the boot disk is next searched for a file created by the user (CONFIG.SYS) and which contains commands instructing the operating system how to handle certain operations such as how many files may be opened at a time, and so-called device drivers which describe the existence and characteristics of hardware devices not recognized by BIOS that may be connected to the PC.

Next loaded from the boot disk into RAM is the file COMMAND.COM which is an operating system file containing, among other functions, fundamental DOS commands used throughout application program execution, and a file named AUTOEXEC.BAT created by the user and containing a series of DOS batch file commands or program names to be executed by the PC each time the computer is turned on. This completes the boot up sequence, and at this point the computer is considered fully booted and ready to be used.

The usual types of storage media in order of storage density, are floppy disk, hard disk storage, which are magnetic media, and more recently, CD-ROM which is an optical medium capable of storing a considerable amount of data. A CD-ROM is a "read only" medium, although magneto-optical media, capable of being written to as well as read from, are emerging. Presently, floppy disks are 5.25 or 3.5 inches in diameter, with smaller sizes now emerging, and are capable of storing up to 2.88 megabytes of data. Hard disks store considerably more data, currently in the range of up to 2 gigabits, arranged as clusters disbursed throughout the medium.

CD-ROM's have attributes of both hard disks and floppy diskettes, that is, they have the storage capacity of a hard drive and the replaceability of a diskette. CD-ROM technology currently is capable of storing more than 600 megabytes of read-only data along a continuous spiral track on a phonograph record-like optical medium. As with other disk media, the CD divides its capacity into short segments, or "large frames" for addressing. The number of such large frames varies but can reach about 315,000, each containing 2352 bytes under a defined media standard. Most of the frame contains data and the remainder is divided among a synchronization field, sector address tag field and an auxiliary field. Data stored on the CD-ROM is formatted as sectors of data comprising 800h bytes each, and with boot record residing at a prescribed (11h) sector in the last session on the CD. The boot record points to a boot catalog providing descriptions and locations of disk or diskette image emulations recorded on the CD-ROM, one or more of which may be bootable and may carry an operating system.

Image formats of these three types of media are hierarchical in structure, with diskette lowest and CD-ROM highest, and each medium adding regions of storage overlying the storage regions of the medium beneath it. Referring to FIG. 1, which depicts the image formats of the three media, a floppy diskette starts with a boot record, which is a short program loading the operating system into the main memory, followed by a pair of file allocation tables (FAT's) which record the file structure of the diskette (two FAT's are often provided, as shown, to perform an integrity check on stored files). Next is a root directory which records the files stored on the diskette, and finally the data storage region.

The structure of a fixed disk includes not only the same regions as found in a diskette, but precedes with a reserved region as well as a partition table which, as the first record on the disk, defines the operating boundaries constituting the logical partitions of the disk, if the disk is partitioned by the user.

A CD-ROM adds to that a table of descriptors, such as defined by ISO 9660, as the first record on the CD. How data is organized into files stored on a CD-ROM is designated by the ISO 9660 specification, which specifies, among other things, that a "Primary Volume Descriptor" must reside at sector 10h relative to the start of a session, followed by any number of other Volume Descriptors, and then by a "Volume Descriptor Terminator." The boot catalog, following the ISO descriptors, is a directory pointing to the stored images as files as identifying image characteristics. Incorporation by reference is made herein to the ISO 9660 specification in its entirety.

The ISO 9660 specification provides, optionally, new boot capabilities for personal computers, a concept disclosed in the "El Torito" bootable CD-ROM format specification, Version 1.0, recently jointly developed and made publically available by Phoenix Technologies and IBM Corporation, the assignee of the present invention. This specification, incorporated herein by reference, describes how the BIOS boot procedure can be enhanced to support the CD-ROM using INT 13 calling conventions for enabling the CD-ROM to boot as the A drive or C drive without device drivers. In accordance with this specification, if the user selects one of the boot CD-ROM options on a setup menu, and during POST the BIOS detects the presence of a CD-ROM drive, INT 19 at the end of POST will attempt to load the operating system using the boot sequence specified in Setup. To accomplish this, the installable boot CD-ROM feature makes available one of two INT 19 functions, namely, single image and multiple image INT 19.

The single image INT 19 feature accesses the booting catalog in the CD-ROM header, verifies the existence of a boot image on the CD-ROM and reads the initial/default entry and then boots from the disk image specified in this entry. Multiple image INT 19, if instructed to boot from the CD-ROM, accesses the booting catalog, verifies, and then boots from either the image specified in the initial default entry or from one of the other images listed in the section headers and section entries that follow the initial/default entry.

Three types of CD-ROM configuration are shown in FIGS. 2(a)–2(c). In FIG. 2(a), the normal CD-ROM configuration is not bootable; it uses root directory and CD-ROM drivers to access CD-ROM images. In FIG. 2(b), a BIOS with a single boot image capability accesses the initial/default entry to access a single bootable disk image. After loading the operating system, the system can revert to standard CD-ROM drivers and the root directory to access CD-ROM images. In FIG. 3, a BIOS with multiple boot-image capability can access any one of a number of bootable disk images listed in the booting catalog. After loading the operating system, the system can access other items in the disk image with standard INT 13 calls or return to normal access of CD-ROM images using CD-ROM drivers and the root directory.

The operating environment is depicted in FIG. 5, wherein the right hand side is a map of the first 1M of random access main memory. The lowest address of the main memory is occupied by BIOS data, such as interrupt vectors and other machine specific operating parameters such as identification of drives and access to them through BIOS INT 13 functions. The next region of memory is occupied by the operating system, such as DOS, followed by an extended BIOS area, or BIOS EBDA entered during booting. Residing in the upper layers of the main memory are video data and firmware based BIOS which is fixed for all applications. The usual BIOS functions do not recognize a CD-ROM drive, which is instead defined by ISO-9660 device driver software residing in the operating system, as shown in FIG. 5.

In FIG. 6, in accordance with the El Torito specification, enhancements made to BIOS EBDA enable the INT 13 calls to recognize the CD-ROM and further to provide for hard disk and floppy diskette image emulations derived from the CD-ROM storage files, that is, to treat the emulation images as if they are physical drives. In this example, the CD-ROM image which is booted becomes the A (floppy diskette) drive, and the physical A drive is renamed as drive B.

An important advantage of bootable CD-ROM's in accordance with the El Torito specification is the capability of emulating one or more real drives. These emulations can also be changed dynamically via BIOS calls. Although DOS can properly process changes in emulation for diskette drives that are present at initial booting, DOS cannot identify new logical diskettes or changes to hard files. To process changes in emulation, DOS must be rebooted. However, the normal boot process clears all storage; some systems do not have access or space in other storage areas for preserving BIOS emulation parameters, such as the device table identifying drive number, memory partitioning and mapping associated with an emulation.

SUMMARY OF THE INVENTION

The invention provides a data processing system comprising a central processing unit (CPU), a system memory for storing data in the form of electrical signals, a first port for receiving an input device generating electrical input signals, and at least one second port for supplying electrical output signals to output devices. The CPU is of a type including a BIOS circuit for carrying out prescribed functions including converting operating signals developed by an operating system executed by the CPU into electrical signals compatible with devices that are responsive to signals provided by the CPU to the system bus. The data processing system further includes a drive for a non-volatile mass storage medium, such as a CD-ROM, storing multiple emulated drive images, and a system bus interconnecting the CPU, system memory, first and second ports and mass storage medium driver.

To install new emulation parameters into DOS upon change of emulated drive, a warm boot must be performed. In accordance with a principal aspect of the invention, the BIOS is programmed so as to preserve prescribed BIOS emulation parameters across the boot sequence. In the preferred embodiment, this is accomplished by defining a protected region of system memory and, responsive to a command for a warm boot for installing the emulation parameters, moving the parameters from BIOS to the protected memory region, clearing the system memory in regions other than the protected region, restoring the emulation parameters to the BIOS, and initializing the system based upon the restored BIOS parameters.

Numerous advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWING(S)

FIG. 1 is a diagram showing image formats of diskette, hard drive and CD-ROM storage media.

FIGS. 2(a)–2(c) are diagrams showing configurations of non-bootable CD-ROM, single boot image CD-ROM and multiple boot image CD-ROM, respectively.

FIGS. 12(a)–12(d) are memory maps showing regions of memory cleared during boot in accordance with conventional processes and the invention, respectively.

Figure 13:
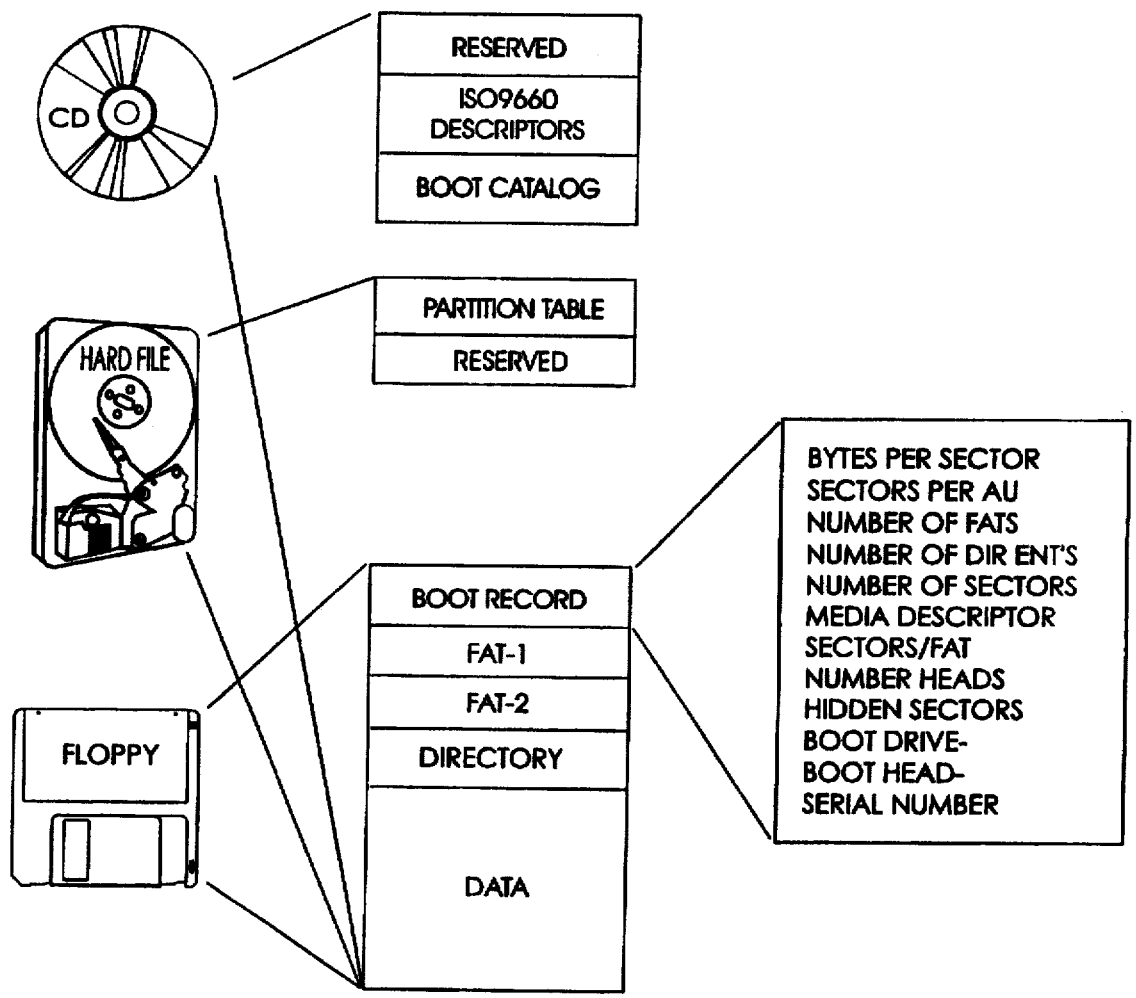

FIG. 13 is a diagram of media image format including a detail of the BIOS Parameter Block (BPB).

DESCRIPTION OF THE ILLUSTRATIVE EMBODIMENT(S)

Figure 1:
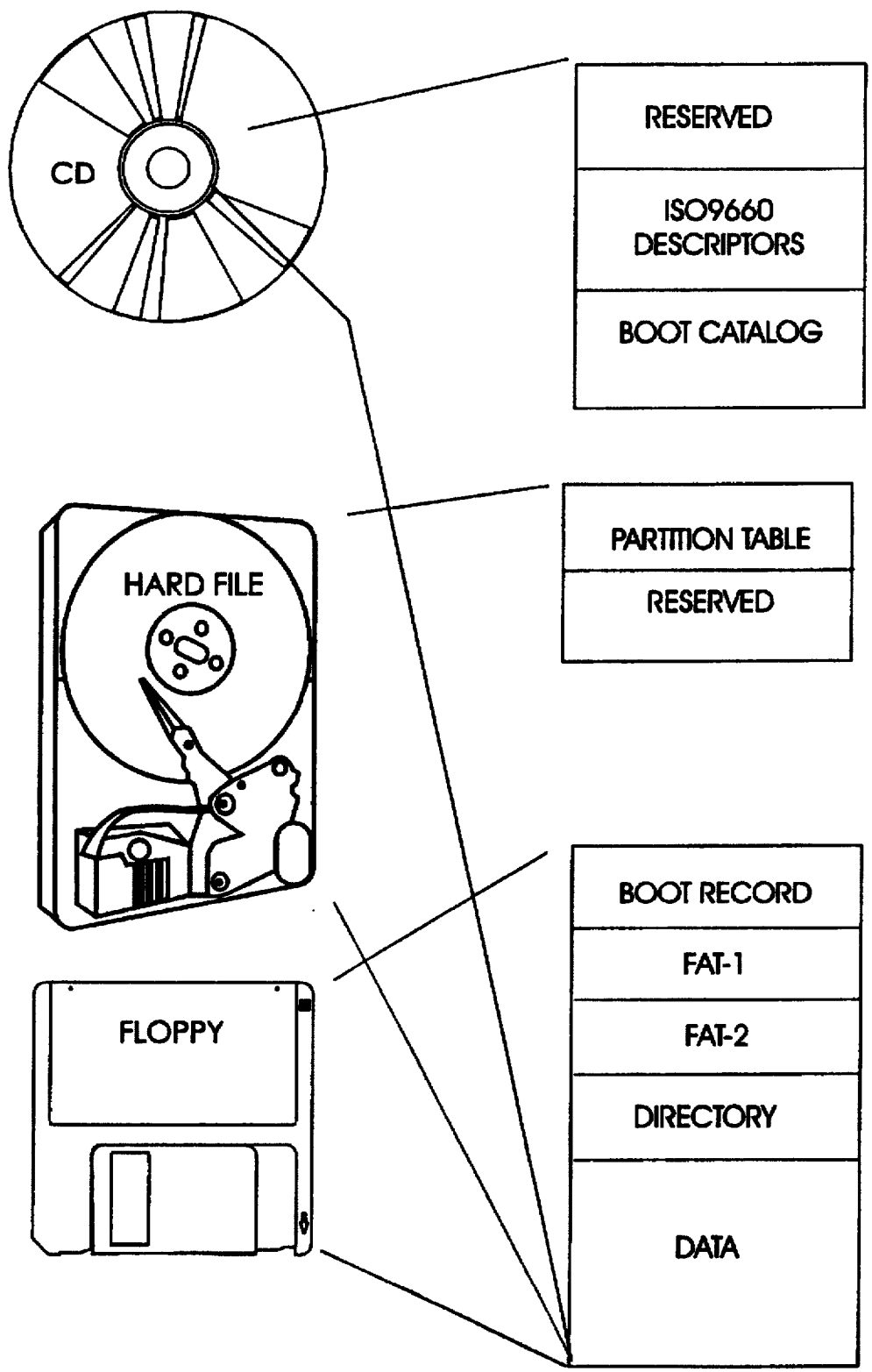
Figure 3:
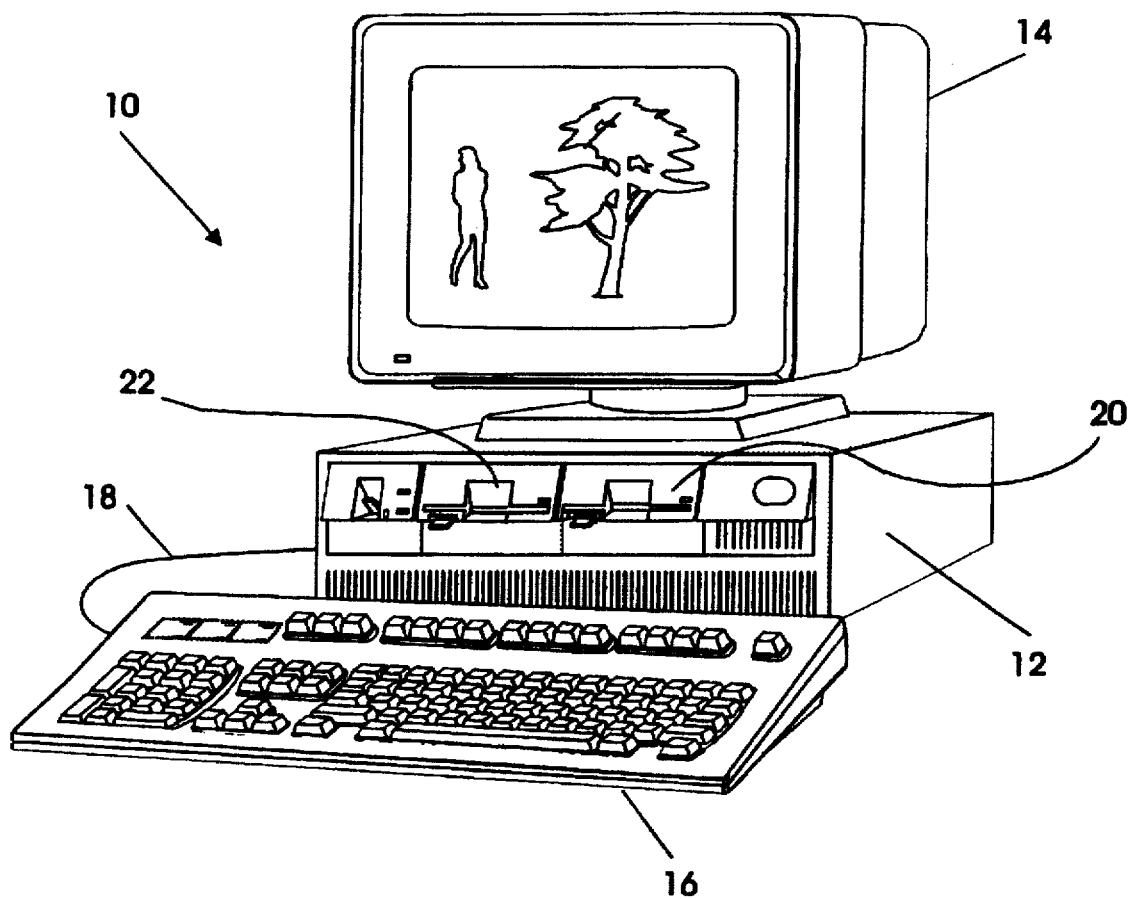
FIG. 3 is a perspective view of a personal computer system within which the present invention has application.

With reference now to the Figures, and in particular with reference to FIG. 3, a personal computer, or PC, designated 10 is of the environment to which the invention has particular utility. The computer 10 which preferably, but not necessarily, is of a type utilizing an IBM Personal Computer 2 or similar system, includes a console housing 12 within which circuit boards containing the necessary circuitry including microprocessor and BIOS chips, controllers, random access memory and other hardware are arranged. The computer will also include a display 14 and a keyboard 16 connected into the housing 12 through cable 18. Mass storage media include a hard drive within the housing and not accessible to the user, and user accessible floppy disk and CD-ROM drives 20 and 22.

Figure 4:
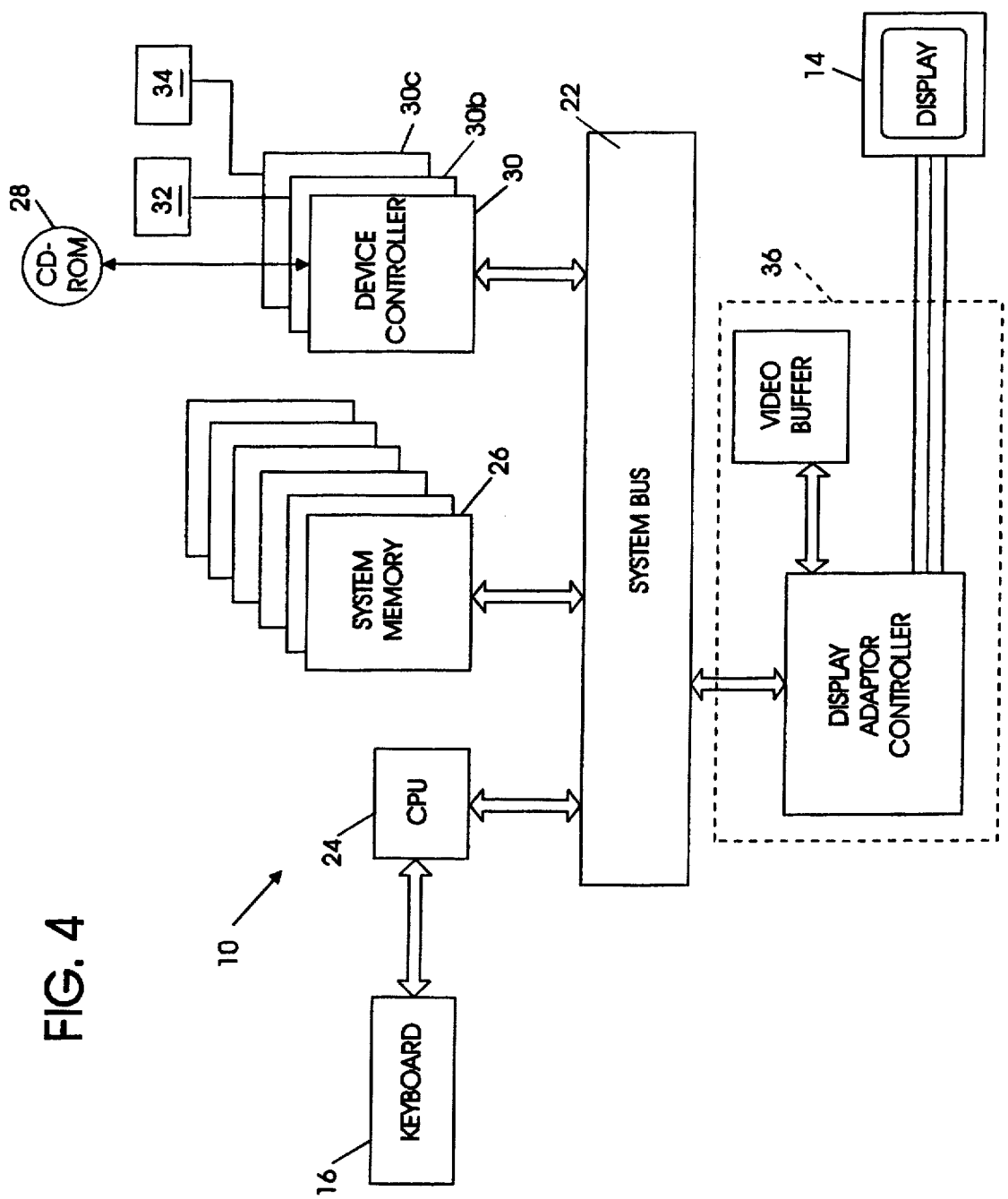
FIG. 4 is a block diagram of a personal computer based data processing system within which the invention may reside.
Figure 5:
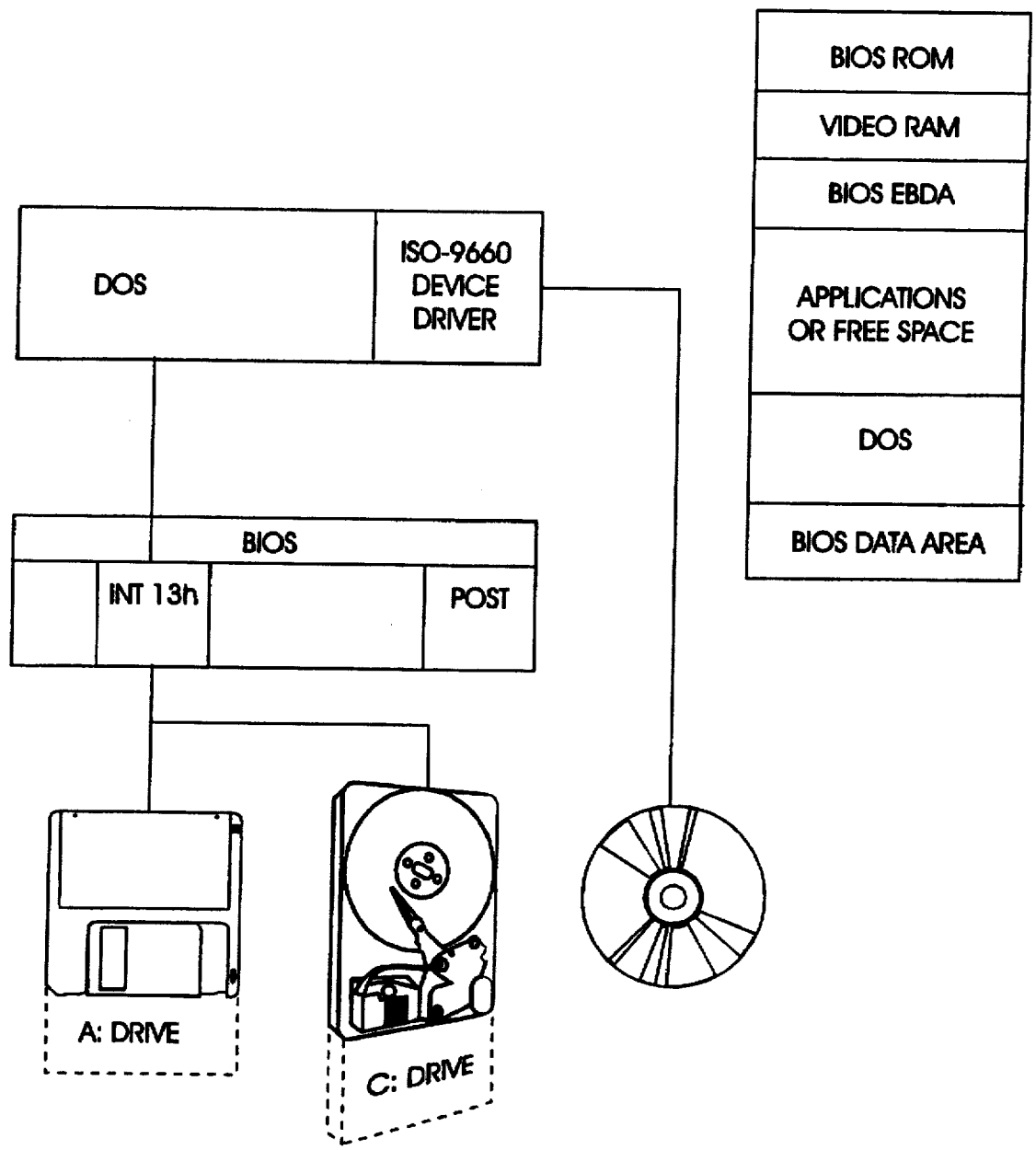
FIG. 5 is a diagram of the ISO-9660 operating environment upon which the invention is optionally based.
Figure 6:
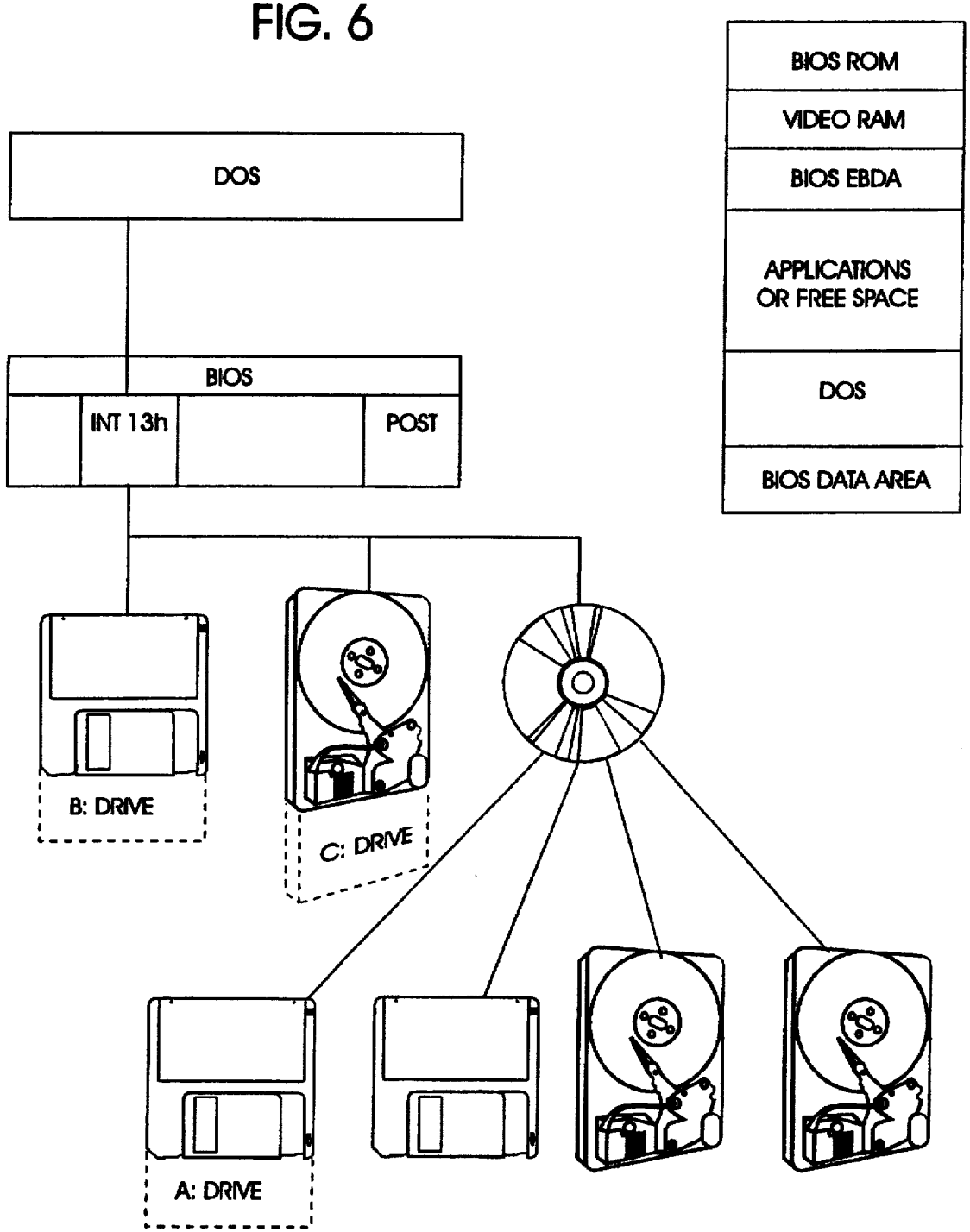
FIG. 6 is a diagram showing BIOS implementation of multiple CD-ROM image emulation per the El Torito specification.

The architecture of computer system 10, depicted in FIG. 4, is based on a system bus 22 on which data is passed between components of the computer, including a central processing unit (CPU) 24 which preferably is based on one of the "486" family or more powerful types of processors, manufactured by Intel Corporation or others, executes programs stored in main or system memory 26 and manipulates data stored in the same memory. Data, including multimedia, may be stored in CD-ROM 28 and accessed by CPU 24 per ISO 9660 specifications through a device controller 30 connected to system bus 22. Other data are stored in floppy and hard disk drives 32 and 34 for access by the CPU 24 through corresponding controllers 30b and 30c. Display 14 is connected to the system bus 22 through a video controller 36.

Preferably, the CD-ROM is bootable, as described previously, and in the invention is formatted in accordance with the El Torito bootable CD-ROM format specification. The bootable CD-ROM format incorporated by the invention maintains compatibility with ISO-9660 while providing BIOS with a means of finding the location on the CD that contains the material to be booted. The format is detailed in an appendix hereto (APPENDIX).

Figure 7:
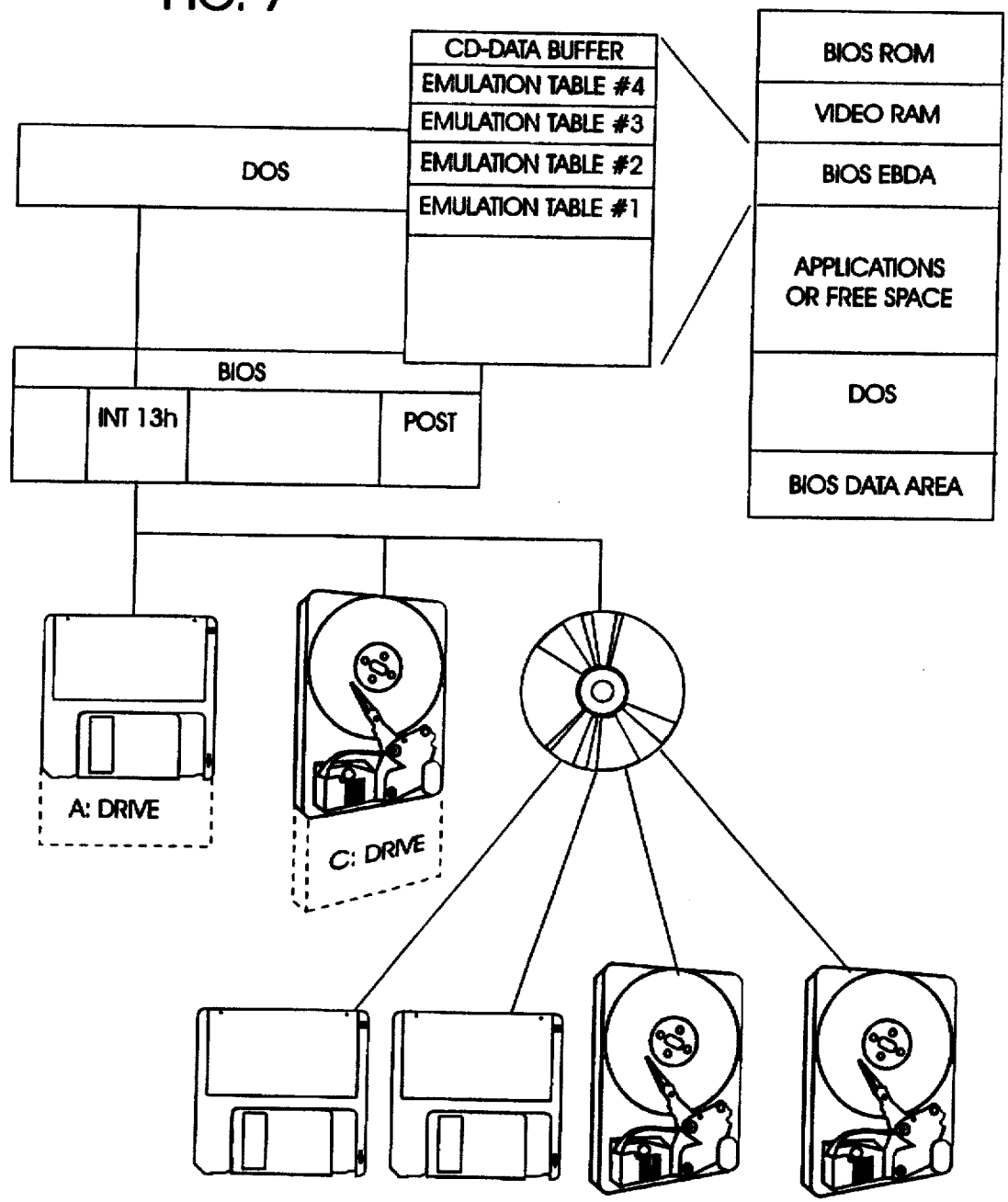
FIG. 7 is a diagram showing multiple emulation tables residing in BIOS EBDA.

With reference to FIG. 7, multiple emulation CD-ROM images are made available to the user through multiple emulation tables added in accordance with the invention to the BIOS EBDA, four being illustrated in the present example of FIG. 7. Each of these tables is dynamically associated with a logical drive letter. The table provides the translation necessary to map the logical drive to a selected image on the medium. An example of a device table is as follows:

| | | | |
|---|---|---|---|
| SpSize | db | ? | ;set if table active |
| SpMediaType | db | ? | |
| SpDrive | db | ? | ;logical drive |
| SpController | db | ? | |
| SpLba | dd | ? | ;physical location on medium |
| SpLun | db | ? | |
| SpBus | db | ? | |
| SpCacheSegment | dw | ? | |
| SpLoadSegment | dw | ? | |
| SpLoadCount | dw | ? | |
| SpCylinder | db | ? | ;physical mapping information |
| SpSector | db | ? | |
| SpHead | db | ? | |
| TotalSectors | dd | ? | |
| SectCylinder | dw | ? | |
| MediaChange | db | ? | ;set if medium has changed |
| LockCount | db | ? | ;logical media lock |
| BootOffset | dw | ? | ;location of boot sector |
| | dw | ? | ;contains cipher key | wherein the "Sp" prefix designates "specification," db, dw and dd represent byte, word and double word, respectively, and a "?" indicates a reservation in main memory.

Each table describes all the characteristics of a CD-ROM image to be emulated, such as size, media type, and format entities peculiar to hard drive and diskette media. The final entry in the table is a cipher key used in conjunction with file decryption at BIOS level in accordance with the copending application entitled Data Processor Having BIOS Decryption of Emulated Media Images. BIOS, by activating any table per the El-Torito specification (describing only single emulation table implementation) INT 13 Function 4A, can determine which drive is being emulated, and where on the CD-ROM the emulation is to be found.

Figure 8:
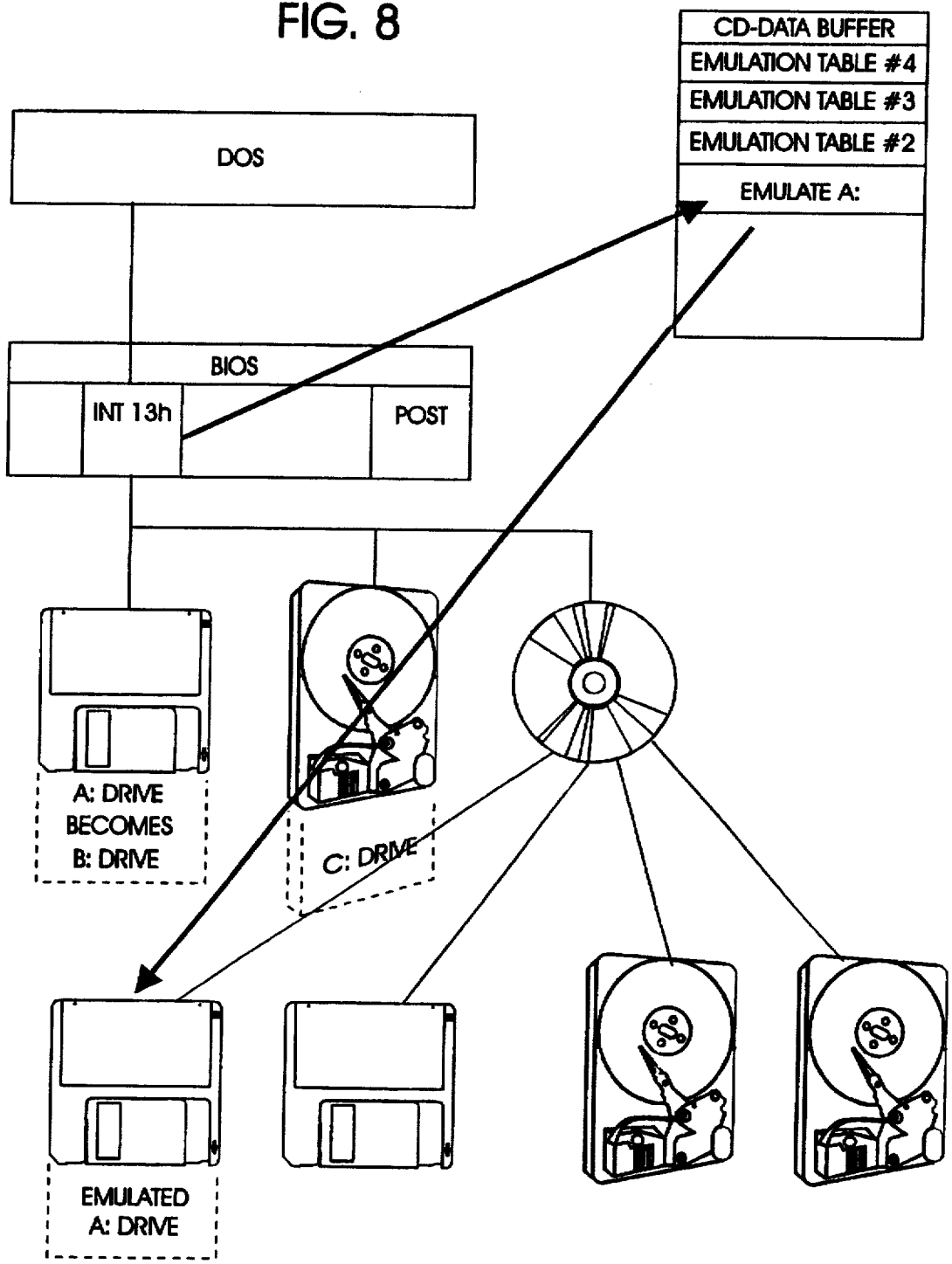
FIG. 8 shows emulation of a CD-ROM image by table activation.
Figure 10:
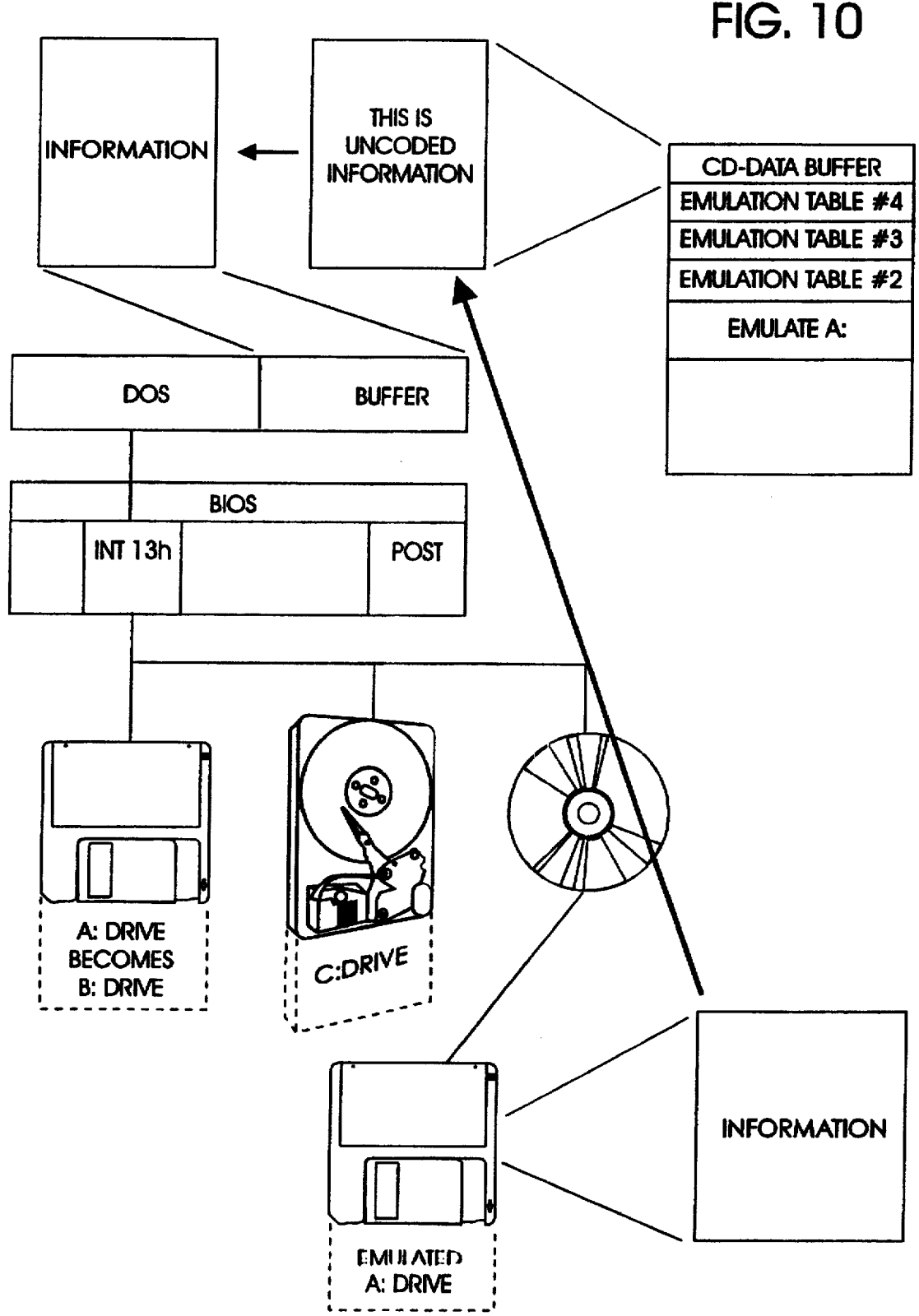
FIG. 10 is a diagram showing transfer of data during drive emulation.

For example, with reference to FIG. 8, emulation of drive A is initiated by activation of the corresponding table by a BIOS call through INT 13, when, as mentioned previously, the physical A drive becomes renamed as the B drive, the A drive having been replaced by the emulation. Data flow under this condition is shown in FIG. 10. File data is being read from emulated A drive on the CD-ROM. This data is sent to the CD data buffer within the BIOS EBDA, and from there transferred to a buffer within the operating system, DOS in this example. Other buffers may also contain data read from the other emulations, as follows.

Figure 9:
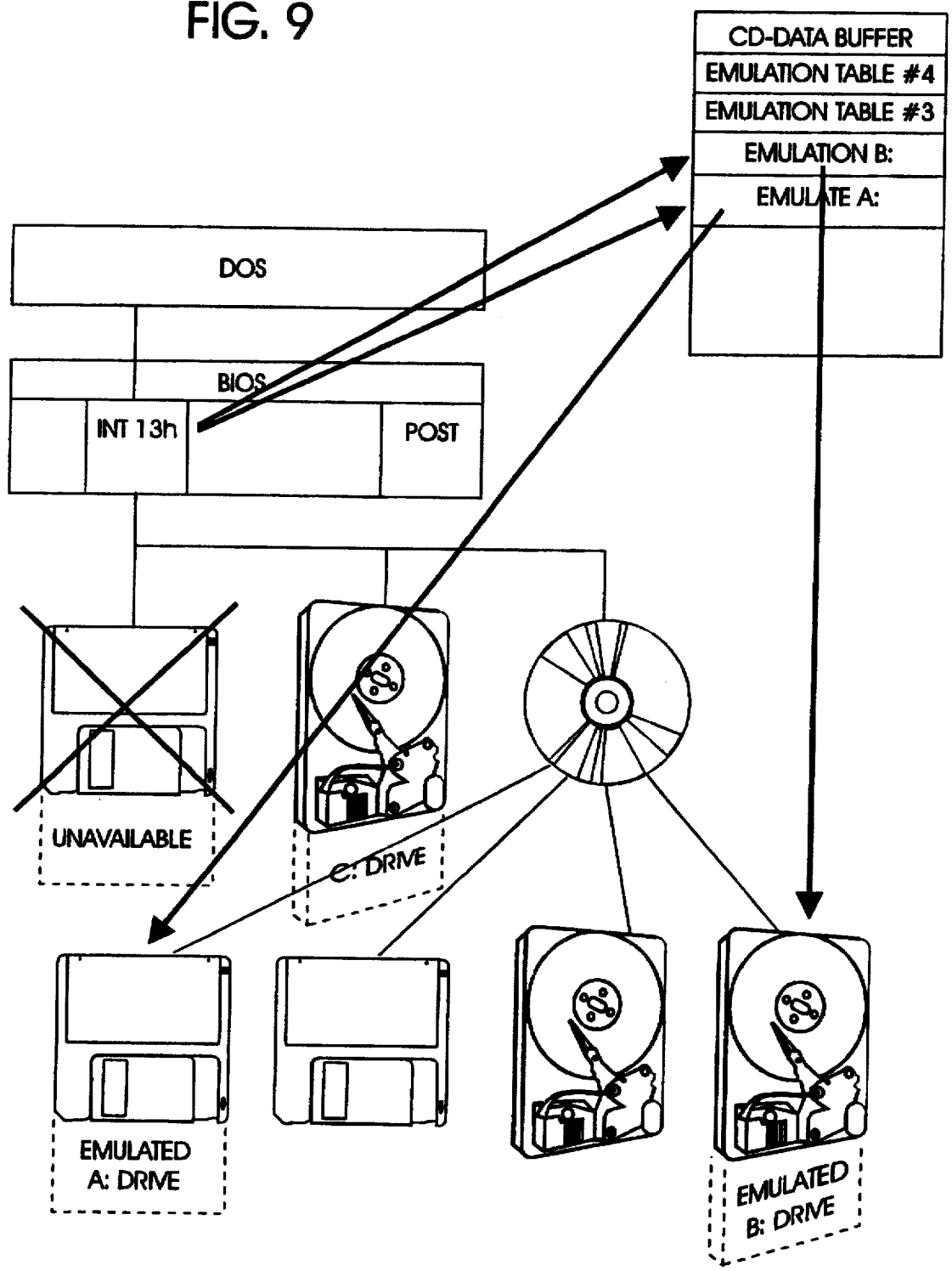
FIG. 9 shows multiple table activation to emulate two drives simultaneously.

With the A drive emulation remaining active, the BIOS table for emulation B is next activated, as shown in FIG. 9, so that both drive images remain accessible to the user at the same time, without requiring a reboot. In this case a hard drive image emulation replaces the physical B drive which becomes unusable.

As previously noted, whereas DOS can properly process changes in emulation for diskette drives that are present at initial booting, DOS cannot identify new logical diskettes or changes to hard files. To process changes in emulation, DOS must be rebooted. However, the normal boot process clears all storage; some systems do not have access or space in other storage areas for preserving BIOS emulation parameters, such as the device table shown above identifying drive number, memory partitioning and mapping.

Figure 12A:
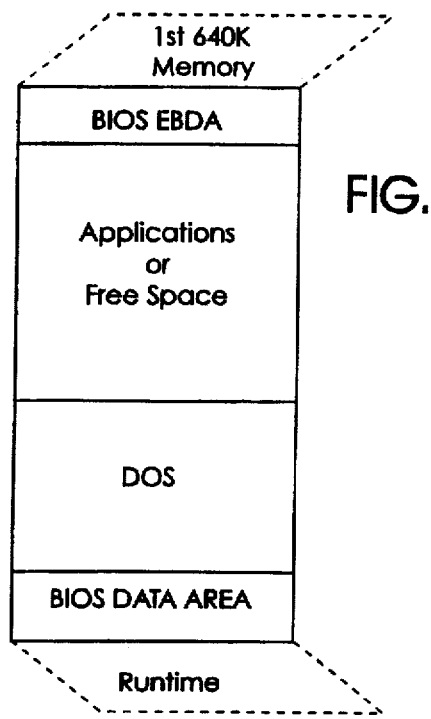
Figure 12B:
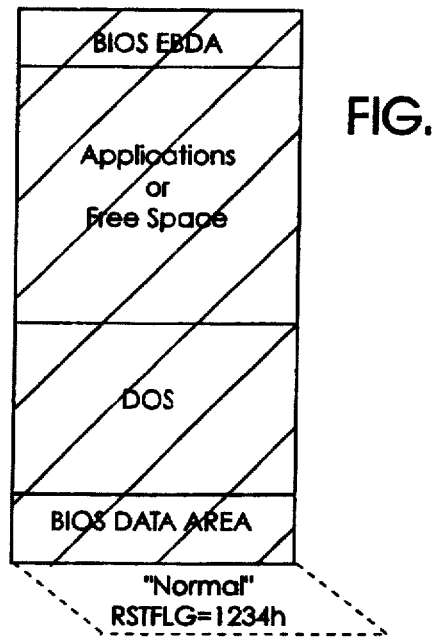
Figure 12C:
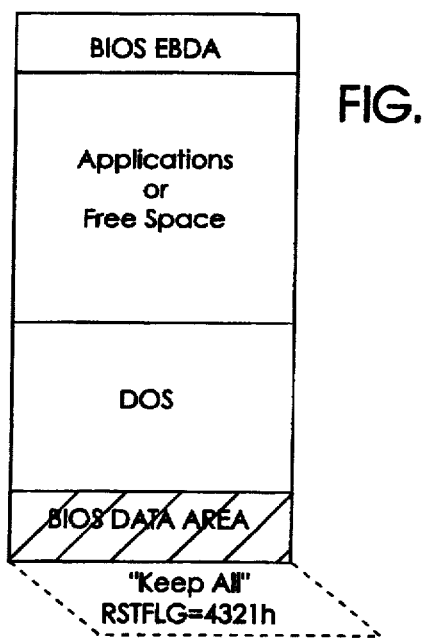

For example, during the time the computer is normally running, the main memory will be fully operational, with all regions in an active condition as shown in FIG. 12(a). However, with reference to FIG. 12(b), during a conventional warm boot, all contents of the main memory are cleared as indicated by shading. Hence, any drive emulation parameters previously stored in BIOS EBDA will be lost across the boot, and unless the emulation parameters are preserved elsewhere, the operating system will be incapable of identifying the characteristics of the drive now being emulated. FIG. 12(c) shows a situation that arises with some types of computer, such as in IBM PS/2 systems where, upon a warm boot, only the BIOS data area is cleared. In the present invention, however, shown in FIG. 12(d), the main memory is cleared except for the BIOS EBDA containing the emulation parameters, which are preserved across a warm boot.

The data thereby preserved may comprise the emulation data presented in the table presented previously, or the contents of the BIOS Parameter Block (BPB) within the boot record in the BIOS EBDA shown in FIG. 13. However, other emulation data can be included within the protected segment of memory.

Figure 11:
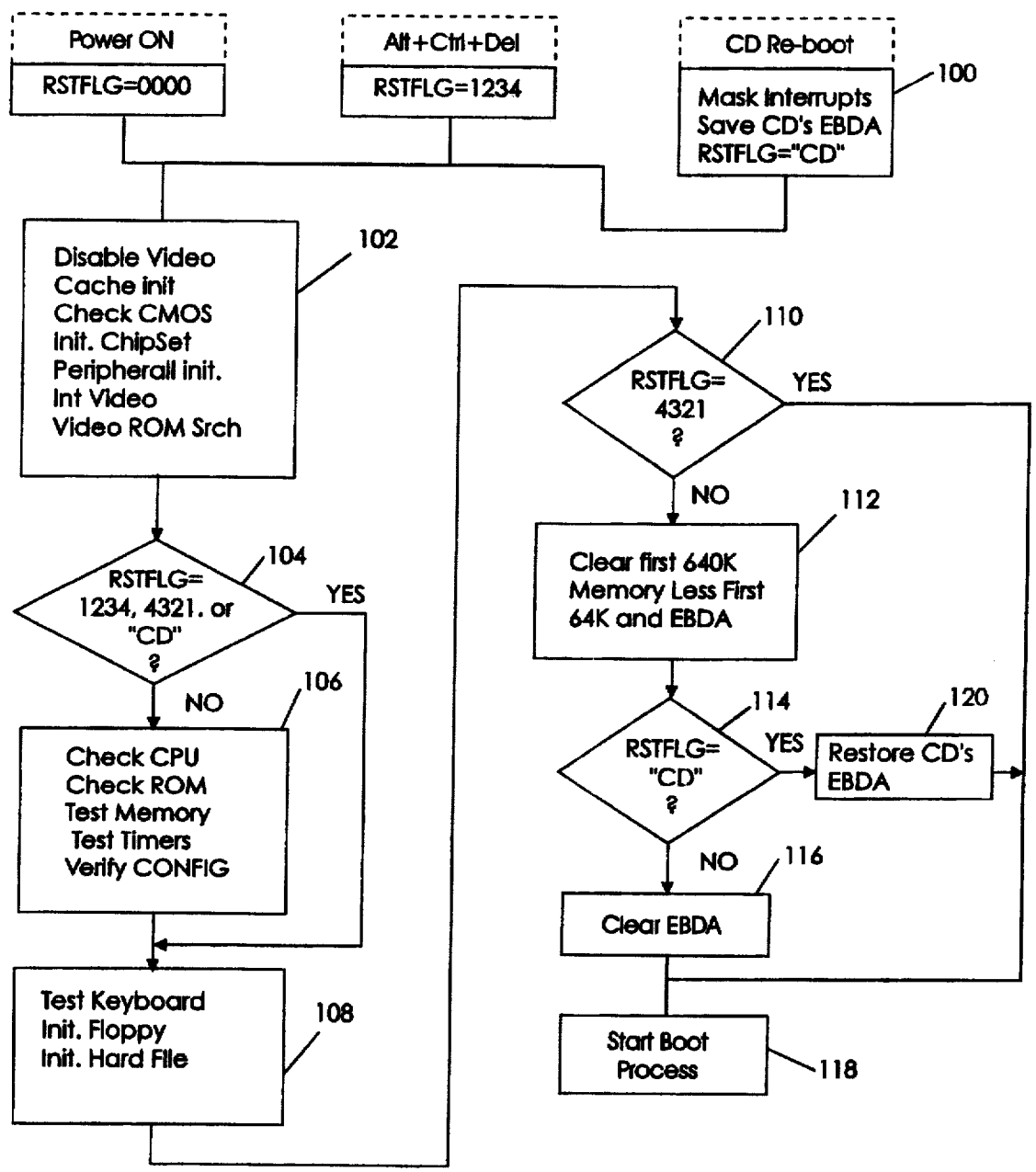
FIG. 11 is a flow chart showing a warm boot sequence preserving BIOS emulation parameters, as practiced in accordance with the invention.

FIG. 11 is a flow chart describing, on a relatively high level, the sequences of events that are performed upon calls for (1) cold booting which occurs upon power up (RSTFOG=0000), (2) manual warm boot, which is initiated through the keyboard (RSTFLG=1234), (3) warm boot, which occurs upon certain conditions during data processing by IBM's PS/2 computer (RSTFLG=4321), and (4) in accordance with the invention a change of image emulation by CD (RSTFLG="CD").

Upon a power up, with the reset flag being set to 0000, hardware initialization is carried out in step 102 followed by a power on system test sequence, step 106. Next, the keyboard is tested and drives initialized, step 108, and the sequence continues to steps 112 and 116 when the memory is cleared, and to step 118 from where the usual subsequent steps of the boot sequence are continued.

Upon a manually called warm boot, with the reset flag set to 1234, hardware initialization per step 102 is performed. Decision step 104, recognizing a warm boot, causes the sequence to jump to step 108, bypassing POST step 106, for tesing the keyboard and initializing the drives, and then steps 112–118 are performed when the memory is cleared per FIG. 12(b), and boot continued.

Upon a warm boot per PS/2 processing, with the reset flag set to 4321, POST step 106 is bypassed, and the keyboard tested and drives initialized (step 108). Decision step 110, recognizing the flag, will cause the sequence to jump to step 118, bypassing steps 112–116 which clear main memory. In this case, only the BIOS DATA AREA of the main memory is cleared, as shown in FIG. 12(c).

Figure 12D:
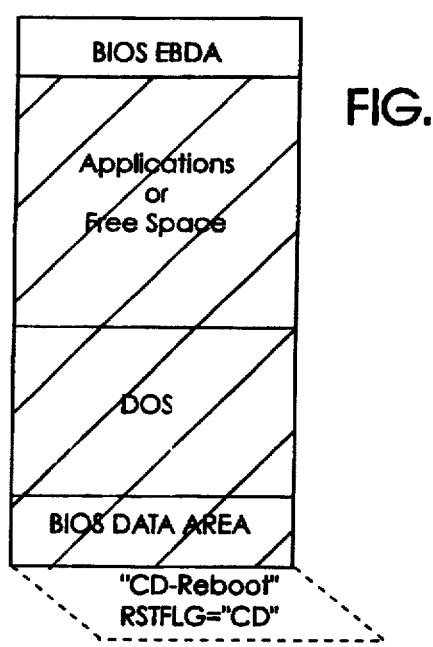

A change of image emulation is shown schematically in the flow chart of FIG. 11 when the flag is set to CD. Under this condition, interrupts are marked and the EBDA area of the CD moved to elsewhere in main memory, step 100. This move is necessary because during booting DOS may relocate the EBDA to some other area. Hardware initialization is next performed, POST step 106 bypassed but keyboard test and drive initialization carried out (step 108). In step 112, the memory is first cleared, but the lowest 64K as well as the region of memory containing the EBDA is preserved. Then, in accordance with decision step 114 responding to the CD flag, the EBDA is restored to the BIOS EBDA region of memory, as shown in FIG. 12(d).

Since the boot drive may have changed as a result of emulation, the operating system that is started may not be the same one that initiated the re-boot. In any event, DOS now recognizes the new drive configuration, and can properly access the content.

There accordingly has been described a system wherein bootable drive emulations are stored in a mass storage medium, such as a CD-ROM, and wherein emulation parameters are stored in BIOS EBDA. Upon a change of emulated media, when a warm boot is carried out to enable DOS to process the change, the BIOS emulation parameters are preserved in a section of memory that is bypassed upon memory clearing.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, it is apparent that, although description of the invention is made in the context of bootable CD-ROM media, the invention has broader application with respect to other storage media, and in other environments such as booting across a serial port.

What is claimed is:

1. A data processing system, comprising:

a central processing unit (CPU);

a system memory for storing data in electrical signal form;

a first port for receiving an input device generating electrical input signals;

at least one second port for supplying electrical output signals to output devices;

a BIOS included within the CPU for carrying out prescribed functions including converting operating signals developed by an operating system executed by the CPU into signals compatible with devices that are responsive to other signals applied by the CPU;

a non-volatile mass storage medium storing multiple independent applications in the form of data on respective BIOS emulated images;

a drive for the non-volatile mass storage medium;

a system bus interconnecting the CPU, the system memory, the first and second ports and the drive for the mass storage medium;

the BIOS including an extended BIOS data area containing media emulation parameters in emulation tables; and programming defining a protected volatile memory region of said system memory and responsive to a command for a warm boot for duplicating and preserving only across the warm boot the media emulation parameters in the protected volatile memory region, initiating an operating system reboot sequence including clearing regions of the system memory other than the protected region, and restoring the new media emulation parameters into the emulation tables in the extended BIOS data area.

2. The system of claim 1, wherein said mass storage medium comprises a CD-ROM.

3. The system of claim 1, wherein said programming resides at BIOS level.

4. For a data processing system of a type comprising a central processing unit (CPU), a system memory for storing data in electrical signal form, a first port for receiving an input device generating electrical input signals and at least one second port for supplying electrical output signals to output devices, a non-volatile mass storage medium storing multiple independent applications in the form of data on respective BIOS emulated images, a drive for the non-volatile mass storage medium, and a system bus interconnecting the CPU, system memory, first and second ports and the drive for the mass storage medium:

a BIOS for carrying out prescribed functions including converting operating signals developed by an operating system executed by the CPU into electrical signals compatible with devices that are responsive to other signals supplied by the CPU to the system bus, the BIOS including an extended BIOS data area containing media emulation parameters in emulation tables and including programming defining a protected volatile memory region of said system memory and responsive to a command for a warm boot for duplicating and preserving only across the warm boot the media emulation parameters in the protected volatile memory region, initiating an operating system reboot sequence including clearing regions of the system memory other than the protected volatile memory region, and restoring the new media emulation parameters into the emulation tables in the extended BIOS data area.

5. A method of operating a data processing system comprising at least a central processing unit (CPU), input and output ports, a system memory for storing data in electrical signal form, a drive for writing data to and reading data from a mass storage medium, wherein the mass storage medium contains multiple bootable regions emulating one or more storage media drives, and a system bus interconnecting the CPU, the input and output ports, the drive and the system memory, the CPU including a BIOS for carrying out prescribed functions including converting operating signals developed by an operating system executed by the CPU into electrical signals compatible with devices that are responsive to signals provided by the CPU to the system bus, the method comprising the steps of:

storing storage media emulation parameters in emulation tables in an extended region of the BIOS, defining a protected memory region in volatile memory of the system memory, processing a change of storage media having new emulation parameters in response to a command for a warm boot, moving the media emulation parameters from the extended BIOS region into the protected memory region in volatile memory of the system memory and preserving the media emulation parameters in the protected memory region only across the warm boot sequence, initiating an operating system reboot sequence including clearing regions of the system memory other than the protected memory region in volatile memory of the system memory, and restoring the media emulation parameters to the extended BIOS region.

6. The method of claim 5, wherein the mass storage medium comprises a CD-ROM configuration having at least one bootable drive emulation.

7. The method of claim 6, wherein the CD-ROM configuration includes a drive emulation having a booting catalog pointing to at least one default bootable disk image and another entry, wherein the booting catalog also points to a second bootable disk image, and wherein, upon the command for warm boot, an initial boot sequence is initiated from the booting catalog, and thereafter, selectively, from the another entry in the booting catalog.

8. A data processing system, comprising:

a central processing unit (CPU);

a system memory for storing data in electrical signal form;

a first port for receiving an input device generating electrical input signals;

at least one second port for supplying electrical output signals to output devices;

the CPU including a BIOS for carrying out prescribed functions including converting operating signals developed by an operating system executed by the CPU into electrical signals compatible with devices that are responsive to other signals applied by the CPU to the system bus;

a non-volatile mass storage medium storing multiple independent applications in the form of data on respective BIOS emulated images;

a drive for a non-volatile mass storage medium;

a system bus interconnecting the CPU, system memory, first and second ports and mass storage medium drive; and the BIOS including an extended BIOS data area containing media emulation parameters in emulation tables and means for preserving the media emulation parameters in volatile memory of the system memory across only a warm boot sequence.

9. The system of claim 8, wherein said mass storage medium comprises a CD-ROM.

10. A data processing system, comprising:

a central processing unit (CPU);

a system memory for storing data in electrical signal form;

a first port for receiving an input device generating electrical input signals;

at least one second port for supplying electrical output signals to output devices;

a BIOS included within the CPU for carrying out prescribed functions including converting operating signals developed by an operating system executed by the CPU into signals compatible with devices that are responsive to other signals applied by the CPU;

a non-volatile mass storage medium storing multiple independent applications in the form of data on respective BIOS emulated images including a drive for the non-volatile mass storage medium;

a system bus interconnecting the CPU, the system memory, the first and second ports and the drive for the mass storage medium;

the BIOS including an extended BIOS data area containing media emulation parameters in emulation tables; and programming defining a protected volatile memory region of said system memory and responsive to a command for a warm boot for duplicating and preserving only across the warm boot the media emulation parameters in the protected volatile memory region, imitating an operating system reboot sequence including clearing regions of the system memory other than the protected region, and restoring the new media emulation parameters into the extended BIOS data area.

* * * * *